(12) United States Patent
Shin

(10) Patent No.: US 10,297,037 B2
(45) Date of Patent: May 21, 2019

(54) ELECTRONIC DEVICE AND METHOD OF PROVIDING USER INTERFACE THEREFOR

(71) Applicant: Samsung Electronics Co., Ltd., Gyeonggi-do (KR)

(72) Inventor: Sangmin Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 547 days.

(21) Appl. No.: 15/016,732

(22) Filed: Feb. 5, 2016

(65) Prior Publication Data

US 2016/0231918 A1 Aug. 11, 2016

(30) Foreign Application Priority Data

Feb. 6, 2015 (KR) .................. 10-2015-0018428

(51) Int. Cl.
| | |
|---|---|
| *G06F 3/048* | (2013.01) |
| *G06T 7/70* | (2017.01) |
| *G09G 5/00* | (2006.01) |
| *G06F 3/01* | (2006.01) |
| *G06F 3/03* | (2006.01) |

(Continued)

(52) U.S. Cl.
CPC ............... *G06T 7/70* (2017.01); *G06F 3/011* (2013.01); *G06F 3/0304* (2013.01); *G06F 3/048* (2013.01); *G09G 5/00* (2013.01); *G06F 3/14* (2013.01); *G06F 2203/04806* (2013.01); *G06T 2200/24* (2013.01); *G06T 2207/30201* (2013.01); *G09G 5/14* (2013.01); *G09G 2340/0464* (2013.01); *G09G 2340/12* (2013.01); *G09G 2340/14* (2013.01); *G09G 2354/00* (2013.01)

(58) Field of Classification Search
CPC ....... G06T 7/004; G06T 7/70; G06T 2200/24; G06T 2207/30201; G06F 3/011; G06F 3/0304; G06F 3/048; G06F 3/14; G06F 2203/04806; G09G 5/00; G09G 5/14; G09G 2340/0464; G09G 2340/12; G09G 2340/14; G09G 2354/00
See application file for complete search history.

(56) References Cited

U.S. PATENT DOCUMENTS

| | | | |
|---|---|---|---|
| 9,182,889 B1 * | 11/2015 | Karlo | .................. G06F 3/04817 |
| 9,910,927 B2 * | 3/2018 | Cypher | .............. G06Q 30/0251 |

(Continued)

FOREIGN PATENT DOCUMENTS

KR 20150108571 A * 9/2015

*Primary Examiner* — Andrew T Chiusano
(74) *Attorney, Agent, or Firm* — Cha & Reiter, LLC

(57) ABSTRACT

An electronic device that can provide both a mirror function and a user interface. A controller executes the mirror function is coupled to a display that outputs at least one of a mirror function and a user interface. A sensor senses a user approaching the front of the display and captures an image of a target object in front of the display; an input element that receives an input from the user. The controller controls a process of identifying the body region of the user reflected in the display by use of an image captured by the sensor, checks whether the user interface displayed on the display at least partially overlaps display of a body region of the user reflected in the display, and controls the display to rearrange and display the user interface in a region where the body is not being reflected.

21 Claims, 12 Drawing Sheets

(51) Int. Cl.
    *G06F 3/14*         (2006.01)
    *G09G 5/14*         (2006.01)

(56) References Cited

U.S. PATENT DOCUMENTS

| | | | |
|---|---|---|---|
| 2002/0191026 A1* | 12/2002 | Rodden | G06F 3/0481 |
| | | | 715/779 |
| 2007/0279485 A1* | 12/2007 | Ohba | G06F 3/012 |
| | | | 348/41 |
| 2012/0198367 A1 | 8/2012 | Bornheimer et al. | |
| 2013/0145272 A1* | 6/2013 | Boggie | G06F 3/0487 |
| | | | 715/728 |
| 2013/0286047 A1* | 10/2013 | Katano | G02B 27/0101 |
| | | | 345/633 |
| 2014/0085178 A1* | 3/2014 | Kokkosoulis | G09G 3/3611 |
| | | | 345/156 |
| 2014/0164963 A1* | 6/2014 | Klemenz | G06F 3/04883 |
| | | | 715/765 |
| 2014/0226000 A1* | 8/2014 | Vilcovsky | G06F 3/017 |
| | | | 348/77 |
| 2014/0232816 A1* | 8/2014 | Wilson | H04N 7/157 |
| | | | 348/14.08 |
| 2014/0240273 A1* | 8/2014 | Friedlander | G06F 3/0488 |
| | | | 345/174 |
| 2015/0160837 A1* | 6/2015 | Kim | G06F 3/04842 |
| | | | 715/708 |
| 2016/0093081 A1* | 3/2016 | Kim | G06F 3/012 |
| | | | 345/156 |

\* cited by examiner

ELECTRONIC DEVICE AND METHOD OF PROVIDING USER INTERFACE THEREFOR

CLAIM OF PRIORITY

This application claims the benefit of priority under 35 U.S.C. § 119(a) from a Korean patent application filed on Feb. 6, 2015 in the Korean Intellectual Property Office and assigned Serial number 10-2015-0018428, the entire disclosure of which is hereby incorporated by reference.

BACKGROUND

Field of the Disclosure

The present disclosure relates to an electronic device whose display operates as a mirror or displays a user interface according to control of a controller, and to a method of providing a user interface therefor.

Description of the Related Art

In recent years, various mechanical devices for daily use have been replaced with electronic products. Many of them have multiple functions for user convenience. Such multi-purpose articles include electronic devices. For example, among recently introduced articles, half mirror display devices may be used as a mirror and as a display outputting content or information to the user.

SUMMARY

Accordingly, an aspect of the present disclosure is to provide an electronic device that can has both a mirror function and a user interface, and a method of providing the user interface therefor.

In accordance with an aspect of the present disclosure, an electronic device is provided. The electronic device may include: a display operable as a mirror and the display also outputs a user interface; a sensor that senses a user approaching the front of the display and captures an image of a target object in front of the display; an input element receives input from the user; and a controller (control unit) controls a process of identifying the body region of the user reflected in the display by use of an image captured by the sensor, checking whether the user interface displayed on the display at least partially overlaps the body region of the user reflected in the display, and controlling the display to rearrange and display the user interface.

In accordance with another aspect of the present disclosure, a method of providing a user interface is provided. For an electronic device having a display operable as a mirror, the method may include: displaying at least one user interface on the display operating as a mirror; capturing an image of a target object in front of the display; identifying the body region of a user reflected in the display by use of the captured image; checking whether at least one user interface displayed on the display at least partially overlaps the body region of the user reflected in the display; and rearranging the user interface so that the user interface does not overlap the body region of the user reflected in the display.

In another aspect of the present disclosure, the user interface providing method enables the electronic device to output the user interface in a region of the display except for the region of the display where the body region of the user is reflected.

The electronic device and the user interface providing method therefor may enable the user to smoothly manipulate the user interface while looking in the mirror.

BRIEF DESCRIPTION OF THE DRAWINGS

The above and other aspects, features, and advantages of certain embodiments of the present disclosure will become more apparent from the following detailed description taken in conjunction with the accompanying drawings, in which.

DETAILED DESCRIPTION

Figure 1:
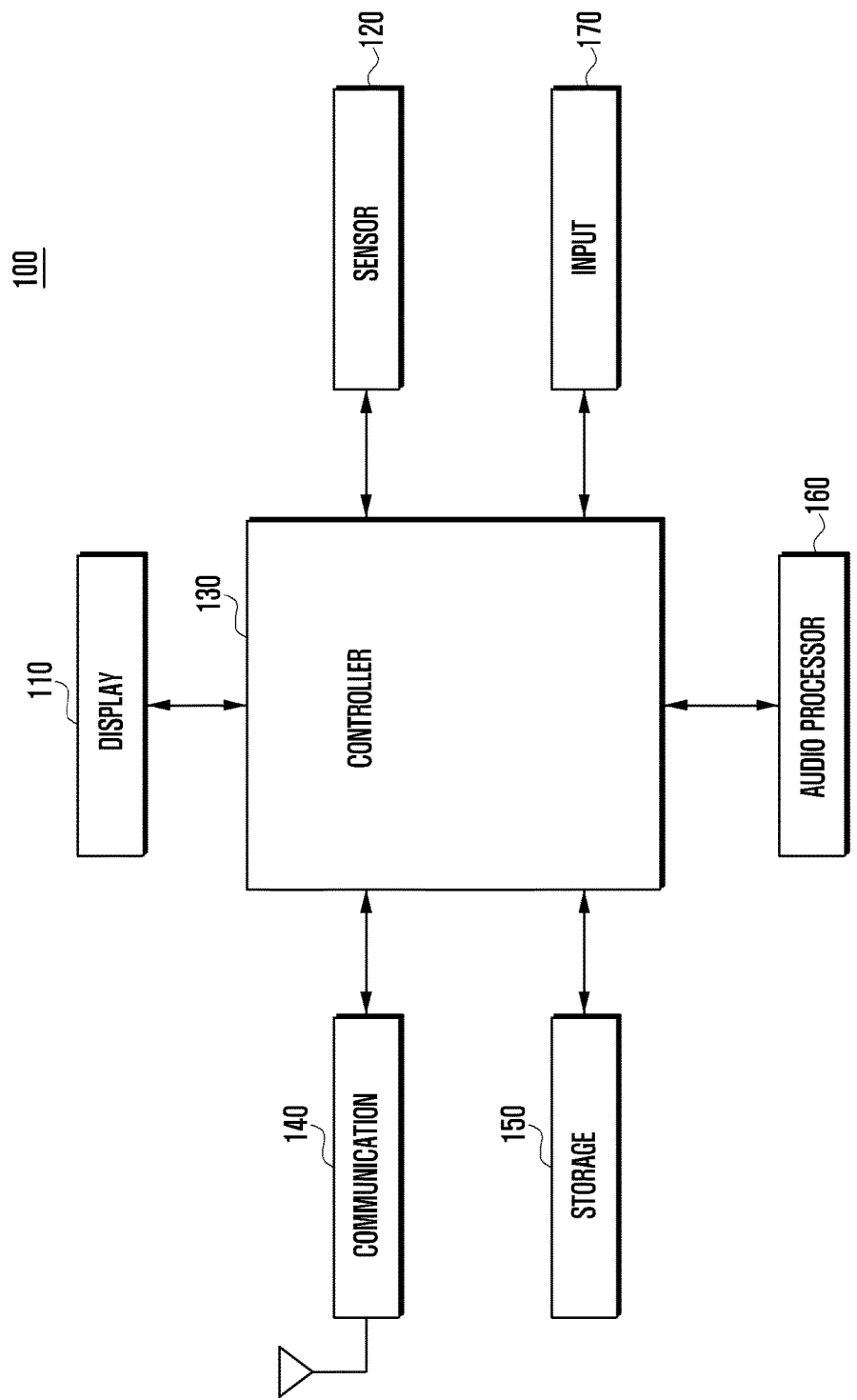
FIG. 1 is a block diagram of an electronic device according to an embodiment of the present disclosure.

Hereinafter, embodiments of the present disclosure are described in detail with reference to the accompanying drawings. Particular terms may be defined to describe the present disclosure in the best manner. Accordingly, the meaning of specific terms or words used in the specification and the claims should not be limited to the literal or commonly employed sense, but it should be construed in accordance with the spirit of the present disclosure.

In the drawings, some elements are exaggerated, omitted, or only outlined in brief, and thus may be not drawn to scale. The present disclosure is not limited by the relative sizes of objects and intervals between objects in the drawings.

In the description, the singular forms "a," "an," and "the" are intended to include the plural forms as well, unless the context clearly indicates otherwise. Furthermore, references such as "A and/or B" should be understood to mean embodiments having A or having B, as well as embodiments having both A and B.

In the description, the word "unit", "module," or the like may refer to a software component, hardware component, or combination thereof capable of carrying out a function or an operation.

Next, the present disclosure is described with reference to the accompanying drawings.

FIG. 1 is a block diagram of an electronic device according to an embodiment of the present disclosure. The electronic device may include a display 110, a sensor 120, a controller 130, a communication 140, a storage 150, an audio processing 160, and an input 170.

The display 110 may act as a mirror according to control of the control 130. In other words, the display may include a half-mirror and usually, the display is identical in function as a normal mirror, in that, for example, the display reflects the person or object in front of the display. By adjusting the backlight, a mirror element of the display causes the display to function as a mirror. Accordingly, an artisan should understand and appreciate that in this disclosure the description of the "electronic device/display operating as a mirror" or similar phrases are to be understood as meaning that a mirror element (e.g. half mirror, etc.) included in the display allows for the display to be used as a normal mirror. In certain devices, when the display emits light, the display exhibits a display function. When the display does not emit light, a mirror function can be output, by controlling a backlight (such as in in an LCD) relative to a mirror element, which may be but is not limited to a semi-reflective layer. The LCD can operate as a mirror in a mirror mode, and a display panel when engaging in transmissive output.

The display 110 may also display a user interface according to control of the controller 130. The display 110 may include a half mirror so as to operate as a mirror. In various embodiments, spaces between LED pixels of the display 110 may be filled with a mirror. The display 110 may be composed of a mirror (e.g. half mirror) stacked on an LCD panel.

The display 110 may display various screens (e.g. media content playback screen, call handling screen, messenger screen, gaming screen, and gallery screen) in the course of operation of the electronic device. When a touchscreen is contained in the display 110, upon detection of a user touch event during screen display, the display 110 may send an input signal corresponding to the touch event to the controller 130. The display 110 may display or output information processed by the electronic device. For example, when the electronic device is in a call handling mode, the display 110 may display a user interface (UI) or graphical user interface (GUI) for call handling. When the electronic device is in a video call mode or capture mode, the display 110 may output a UI or GUI for displaying received or captured images. The display 110 is constructed of hardware using one or more display techniques based on liquid crystal display (LCD), thin film transistor liquid crystal display (TFT-LCD), light emitting diodes (LED), organic light emitting diodes (OLED), active matrix OLEDs (AMOLED), flexible display, bendable display, and 3D display. The display 110 may also use a transparent display technology so as to be visible from the outside.

In one embodiment, the display 110 may operate as a mirror. While operating as a mirror, the display 110 may display a user interface under the control of the controller 130. For example, the user interface may include an application handling screen (e.g. Internet browsing screen, healthcare application screen, or nearby store location screen), application icons, image content, and multimedia content. The user interface may include various pieces of content that may be displayed according to user touch input or control of the controller 130. For example, the user interface may include a menu for executing functions of the electronic device, default icons or screens (indicating the current time, date, weather, and the like) provided by the electronic device.

The display 110 may change the size of items on the user interface or change the size of the user interface under the control of the controller 130. The display 110 may change the position of items on the user interface or change the position of the user interface under the control of the controller 130.

The sensor 120 may include one or more of a gesture sensor, gyro sensor, magnetic sensor, acceleration sensor, proximity sensor, illuminance sensor, and fingerprint recognition sensor.

In one embodiment, the sensor 120 may sense the approach of the user in front of the display 110. For example, the sensor 120 may use a proximity sensor or infrared sensor to sense the approach of the user in front of the electronic device. Upon sensing a user's approach, the sensor 120 may send a sensing signal to the controller 130. This sensing signal may notify the controller 130 of the user approaching the electronic device within a preset distance.

In one embodiment, the sensor 120 may sense the body of the user reflected in the display 110. For example, the sensor 120 may use an image sensor or infrared sensor to sense the appearance of the user approaching the front of the display 110.

In one embodiment, the sensor 120 may capture an image of a target object in front of the display 110. For example, the sensor 120 may sense the user approaching the front of the display 110 and capture an image of the user.

In one embodiment, the sensor 120 may include a camera module. The camera module may be a part of the sensor 120 or an independent module distinct from the sensor 120. The camera module may include a lens to concentrate light, an aperture to adjust the light intensity, a shutter to control the light input, and an image sensor to convert a received optical signal into an electrical signal. The lens may be a zoom lens capable of widening or narrowing the angle of view according to the focus length, or a focus lens capable of focusing on the target object. The lens may be a separate lens or a cluster of multiple lenses. The shutter may be a mechanical shutter composed of vertically traveling curtains. Alternatively, the image sensor may play the role of a shutter by controlling supply of an electrical signal. The image sensor may convert a received optical signal into an electrical signal, which is then sent to the controller 130. The image sensor may be, for example, a charge coupled device (CCD) sensor or a complementary metal-oxide semiconductor (CMOS) sensor.

The camera module includes hardware, and, for example, may include a motor to drive the lens, aperture, and shutter. The motor may be used to drive lens positioning, aperture opening and closing, and shutter action so as to realize automatic focusing, automatic exposure control, aperture adjustment, zooming, and focus adjustment. The motor may control operations of the lens, aperture, and shutter according to a control signal from the controller 130.

In one embodiment, the camera module may capture an image of a target object in front of the display 110 (i.e. electronic device). The camera module may capture a still or moving image of a target object in front of the display 110. The still or moving image captured by the camera module may be sent to the controller 130. When the user approaches the front of the electronic device, the camera module may capture an image of the approaching user.

The camera module may be arranged at the center of the upper end portion of the electronic device. When the display 110 operates as a mirror, the camera module may be arranged so that the still or moving image of the user captured by the camera module matches the appearance of the user reflected in the mirror. That is, the appearance of the user reflected in the display 110 operating as a mirror may resemble the image captured by the camera module. In various embodiments, the position and angle of the camera module may be adjusted so that the image captured by the camera module matches the appearance reflected in the display 110. The shooting angle and magnification of the camera module may be adjusted according to the distance of the user sensed by the sensor 120.

The controller 130 may control the display 110 to operate as a mirror only. The controller 130 may also control the display 110 to display a user interface. In one embodiment, the display 110 may operate as a mirror before display of a user interface. A backlight placed at the back portion of the display 110 may be used to control the display 110 to operate as a mirror. When the controller 130 turns off the backlight of the display 110, the display 110 may operate as a mirror. When the controller 130 turns on the backlight of the display 110, the display 110 may operate as a display screen on which a user interface is presented. In various embodiments, the controller 130 may control the display 110 operating as a mirror to display a user interface, so that the display 110 may display a user interface while operating as a mirror.

The controller 130 may detect the approach of the user on the basis of a sensing signal from the sensor 120. Upon detection of the user at a preset distance from the front of the display 110, the controller 130 may control the display 110 to display a user interface.

The controller 130 may use an image captured by the sensor 120 to determine the body region of the user reflected in the display 110. The controller 130 may determine whether a user interface displayed on the display 110 overlaps the body region of the user reflected in the display 110. For example, the controller 130 may apply image processing and correction operations to an image captured by the sensor 120 so that the image can fit the screen of the display 110 in size and shape. In one embodiment, the controller 130 may identify the body of the user in an image captured by the sensor 120. For example, the controller 130 may recognize the body of the user in the image through analysis of brightness values. The controller 130 may recognize the face region of the user in an image. That is, in an image, the body of the user may correspond to the face region of the user. The controller 130 may recognize the body of the user in part or the whole. The controller 130 may identify the body region of the user reflected in the display 110 by fitting the image captured by the sensor 120 to the display 110.

When a user interface overlaps at least a portion of the body region of the user reflected in the display 110, the controller 130 may reconfigure the user interface. The controller 130 may reconfigure the user interface so that the user interface does not overlap the body region of the user reflected in the display 110.

The controller 130 may adjust the size of a user interface. The controller 130 may adjust the size of the user interface at a preset ratio. When multiple user interfaces are displayed on the display 110, the control 130 may reduce the user interfaces at the same ratio or at different ratios.

The controller 130 may move the position of a user interface displayed on the display 110. For example, the controller 130 may move the user interface from the central region to the upper region or edge region on the display 110. When the body region of the user reflected in the display 110 is placed near the right side of the display 110, the controller 130 may move the user interface to the left side of the display 110. In other words, the controller 130 may move the user interface to a region of the display 110 other than that in which the body region of the user is reflected.

In one embodiment, when a user interface such as an application screen is displayed as a full screen on the display 110, the controller 130 may reduce the user interface and move the reduced user interface out of the body region of the user reflected in the display 110. In other words, the control 130 may change the size and position of a user interface displayed on the display 110 so that the user interface is located outside the body region of the user reflected in the display 110.

In one embodiment, the controller 130 may maintain the size of the user interface so that the user interface is not too small. This is because the user may have difficulty in recognizing a user interface whose size is less than a preset minimum size. The controller 130 may change the minimum size for a user interface according to a user input. In this case, the controller 130 may minimize the size of the user interface and then move the user interface on the display 110 so that the overlap between the user interface and the body region of the user reflected in the display 110 is minimized.

In one embodiment, if the overlap between the user interface and the body region of the user reflected in the display 110 is still present even after the user interface is minimized and moved to the farthest corner on the display 110, the controller 130 may reset the size and position of the user interface to their initial values.

In one embodiment, when the size of the body region of the user reflected in the display 110 is greater than or equal to a threshold value, the controller 130 may rearrange the user interface displayed on the display 110. Specifically, the controller 130 may examine whether the size of the body region of the user reflected in the display 110 is greater than or equal to a threshold size. The controller 130 may also examine whether the proportion of the body region of the user reflected in the display 110 to the whole screen of the display 110 is greater than or equal to a preset threshold. When the size of the body region of the user reflected in the display 110 is greater than or equal to the threshold size, or when the proportion of the body region of the user reflected in the display 110 to the whole screen of the display 110 is greater than or equal to the threshold proportion, the controller 130 may adjust the size and position of the displayed user interface. Here, the threshold size or threshold proportion may be set in advance and changed later according to user input. For example, the controller 130 may reduce the user interface displayed on the display 110 so that the user interface does not overlap the body region of the user reflected in the display 110. The controller 130 may move the user interface displayed on the display 110 so that the user interface does not overlap the body region of the user reflected in the display 110. The controller 130 may rearrange the user interface by reducing and moving the user interface on the display 110 so that the user interface does not overlap the body region of the user reflected in the display 110.

When the body region of the user reflected in the display 110 occupies a small portion of the display 110, the user may not experience much inconvenience in viewing the displayed user interface. As such, when the body region of the user reflected in the display 110 is less than a given size, the controller 130 may not rearrange the user interface displayed on the display 110. On the contrary, although the body region of the user reflected in the display 110 is less than the given size, the controller 130 may rearrange the user interface by adjusting the size and position of the user interface displayed on the display 110.

In one embodiment, when the user interface overlaps the body region of the user reflected in the display 110, the controller 130 may check whether user input is received within a preset time. If user input is received within the preset time, the controller 130 may perform a function corresponding to the user input without rearrangement of the displayed user interface. If user input is not received within the preset time, the controller 130 may rearrange the user interface on the display 110 so that the user interface does not overlap the body region of the user reflected in the display 110. The controller 130 may change the preset time for user input according to user settings. When user input is received after rearrangement of the user interface, the controller 130 may change the size or position of the user interface according to the user input. For example, the controller 130 may enlarge the user interface on which user touch input has been detected. The controller 130 may move the user interface on which user touch input has been detected to the central region of the display 110.

In one embodiment, when an application screen or user interface is not used or not run, the controller 130 may rearrange the user interface displayed on the display 110. Specifically, when the user executes a specific application or interacts with the electronic device 100 in addition to the mirror function, the electronic device 100 may display a corresponding application screen or user interface. In this case, although the application screen or user interface overlaps the body region of the user reflected in the display 110, the user may wish to display the application screen or user interface in the central region of the display 110 or in a large screen format. When a specific application is running or user interaction is in progress, the controller 130 may reposition the corresponding application screen or user interface in the central region of the display 110 or enlarge the corresponding application screen or user interface. Alternatively, when a specific application is running or user interaction is in progress, the controller 130 may not reposition the corresponding application screen or user interface in a region of the display 110 out of the body region of the user reflected in the display 110 or may not enlarge the corresponding application screen or user interface. For example, when a multimedia playback application is running on the electronic device 100, the controller 130 may sustain the corresponding user interface (e.g. multimedia application screen) on the display 110 without changing the size or position thereof. As another example, when a weather application is running on the electronic device 100 as a response of user input, the controller 130 may sustain the corresponding user interface (e.g. weather application screen) on the display 110 without changing the size or position thereof although the user interface overlaps the body region of the user reflected in the display 110.

In one embodiment, when an application or user interaction is activated according to user input, the controller 130 may enlarge the corresponding user interface (e.g. application screen) that has been reduced in size. The controller 130 may also rearrange the corresponding user interface, which has been moved to a region out of the body region of the user reflected in the display 110, at the previous position or a new position on the display 110.

In one embodiment, when user input for initiating interaction or executing an application is received from the user, the controller 130 may display the corresponding user interface (e.g. application screen), which is newly output on the display 110 in response to the user input, without changing the size or position thereof although the corresponding application screen or user interface overlaps the body region of the user reflected in the display 110. The controller 130 may also enlarge the newly output user interface or reposition the same at a different position. When a new user interface is output on the display 110, the controller 130 may change the size or position of at least one of the user interfaces displayed on the display 110.

When the user is not sensed in front of the display 110, the controller 130 may reset the size and position of the user interface to their initial values.

The communication 140 supports wireless communication for the electronic device, and it may include a mobile communication module when the electronic device supports mobile communication. The communication 140 may include a radio frequency (RF) transmitter for upconverting the frequency of a signal to be transmitted and amplifying the signal, and an RF receiver for low-noise amplifying a received signal and downconverting the frequency of the received signal. When the electronic device is configured to support short-range communication such as Wi-Fi, Bluetooth, ZigBee, UWB (Ultra Wideband), and NFC (Near Field Communication), the communication 140 may include a Wi-Fi module, Bluetooth module, ZigBee module, UWB module, and NFC module. In particular, according to user requests, the communication 140 may receive various daily life information from an external electronic device or a server under the control of the controller 130. For example, the communication 140 may receive weather information, traffic information, map information, and time information from an external network. The communication 140 may receive various images and multimedia content from an external network according to user requests.

The storage 150 may store image data, audio data, camera captured data, computational data, algorithms for operation of the electronic device, configuration data, and guide information; and it may temporarily store processing results. The storage 150 may include a volatile memory and a nonvolatile memory. The volatile memory may be a static random access memory (SRAM) or a dynamic random access memory (DRAM). The nonvolatile memory may be a read only memory (ROM), flash memory, hard disk, Secure Digital (SD) memory card, or Multi-Media card (MMC card).

The audio processing 160 may convert an audio signal into an electrical signal and vice versa. For example, the audio processing 160 may include at least one of a speaker, receiver, earphone, and microphone to convert an audio signal being input or to be output. In particular, the audio processing 160 may output sounds related to content being played back on the display 110. The audio processing 160 may receive a voice signal from the user, convert the voice signal to an electrical signal, and send the electrical signal to the controller 130.

The input 170 may include a touch panel, a (digital) pen sensor, keys, and an ultrasonic input part. The touch panel may be a capacitive, resistive, infrared, or ultrasonic touch panel capable of detecting touch input. The touch panel may include a controller circuit. A capacitive touch panel may sense physical contact or proximity without contact. The touch panel may further include a tactile layer to provide a sense of touch to the user.

The pen sensor may be configured to operate in a manner identical or similar to sensing user touch input or operate using a separate recognition sheet. The key may be a physical key, an optical key, or a keypad. The ultrasonic input part may use a microphone (not shown) to detect a signal generated by an input means generating an ultrasonic signal, and may operate wirelessly.

In particular, the input 170 may receive user input. For example, the input 170 may receive user input for manipulating a specific user interface displayed on the display 110. The input 170 may also receive user input for executing a specific function.

In one embodiment, the display 110 and the input 170 may be realized as a single entity. For example, the display 110 and the input 170 may be combined to form a touchscreen. The touchscreen may be configured to convert a pressure change or capacitance change detected at a site into an electrical signal. The touchscreen may be configured to sense not only the position and area of user touch input but also pressure caused by touch input according to a touch technique employed. Upon detection of user input, the touchscreen may send a corresponding electrical signal to a touch controller (not shown). The touch controller may process the received electrical signal and send data corresponding to the processed result to the controller 130. The touchscreen may be composed of a display panel performing the function of the display 110 and a touch panel performing the function of the input 170. The touchscreen (i.e. display 110 and input 170) may sense a touch gesture or touch event on the surface thereof, such as long press, short press, single touch, multi touch, or drag. When the display 110 detects a touch event on the surface thereof, it may identify the coordinates of the touch point and send the coordinate information to the controller 130.

In the following description for various embodiments, the display 110 and the input 170 are depicted as forming a touchscreen. However, the present disclosure is not limited thereto or thereby.

Figure 2:
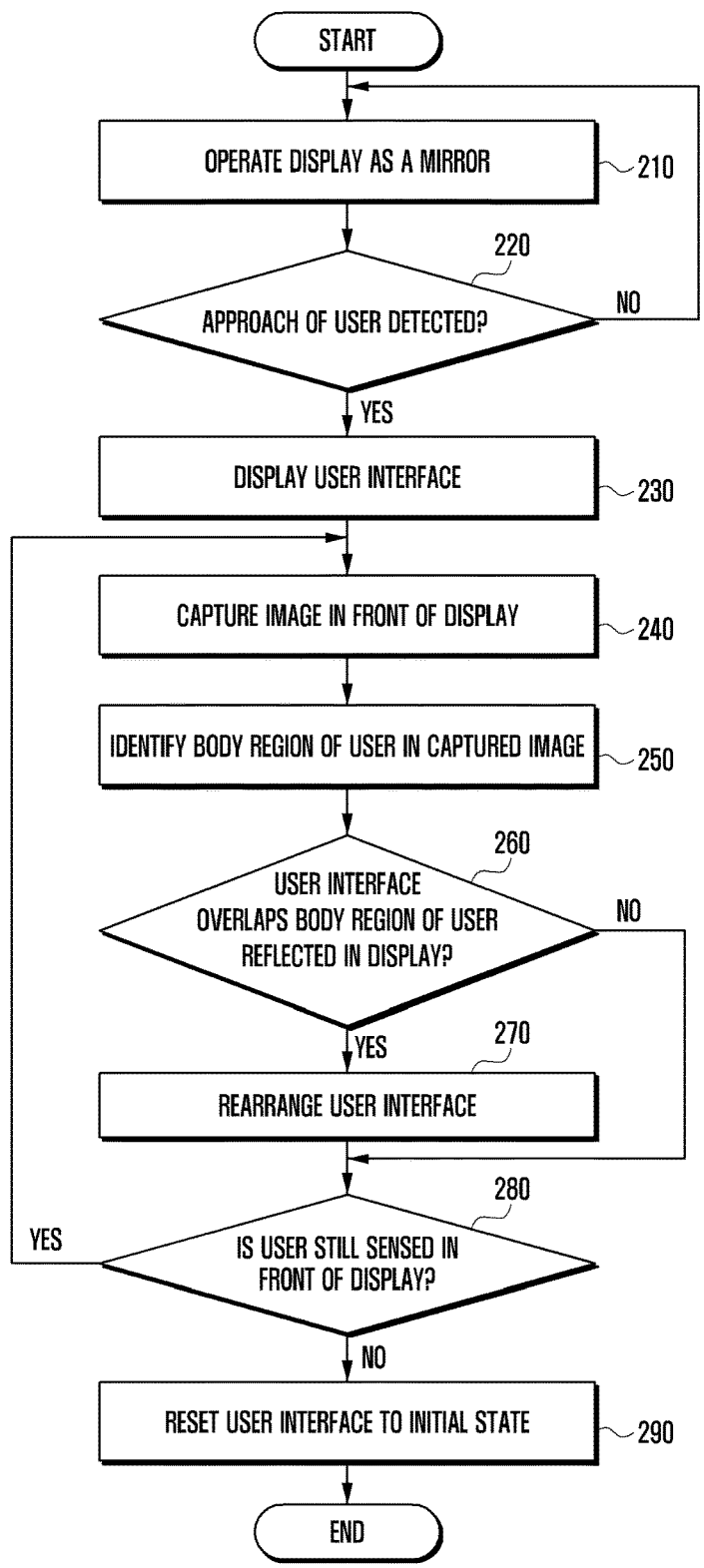
FIG. 2 is a flowchart providing an operative example of a method for providing a user interface in the electronic device according to an embodiment of the present disclosure.

FIG. 2 is a flowchart of a method for providing a user interface in the electronic device 100 according to an embodiment of the present disclosure.

At operation 210, the electronic device 100 operates the display 110 as a mirror. The display 110 may include a mirror or half mirror. That is, the display 110 may operate as a regular mirror before display of a user interface. The electronic device 100 may operate the display 110 as a mirror before display of a user interface at operation 210.

At operation 220, the electronic device 100 detects the approach of the user in front of the electronic device 100. That is, the electronic device 100 may detect the user approaching the front of the display 110. If the approach of the user is detected, the procedure proceeds to operation 230. If the approach of the user is not detected, the electronic device 100 may continue to operate the display 110 as a mirror. The electronic device 100 may use, for example, a proximity sensor or IR sensor to detect the approach of the user at a preset distance from the front of the display 110.

At operation 230, the electronic device 100 displays a user interface on the display 110. The user interface may be an application screen, and may include icons associated with an application, image content, and multimedia content. In various embodiments, the user interface may include a variety of objects displayable on the display 110. The user interface may be displayed on the display 110 operating as a mirror. For example, when application icons are displayed on the display 110, the region of the display 110 except for the region in which the application icons are displayed may operate as a mirror screen.

At operation 240, the electronic device 100 captures an image of a target object in front of the display 110. For example, the electronic device 100 may use a camera module to take a still or moving image of a target object in front of the display 110.

At operation 250, the electronic device 100 identifies the region of the display 110 in which the user is reflected. The electronic device 100 may use the image captured at operation 240 to identify the body region of the user reflected in the display 110. The electronic device 100 may identify the body of the user in an image (or moving image) obtained by capturing the front of the display 110. For example, the electronic device 100 may identify the facial region of the user in the image (or moving image) through face recognition. The electronic device 100 may correct a captured image (or moving image) by use of image processing techniques. For example, the electronic device 100 may adjust a captured image (or moving image) so that the image fits the display 110 in size and shape. When the body of the user is in a region of a captured image (or moving image), the electronic device 100 may determine the body region of the user reflected in the display 110 operating as a mirror by mapping the image region to the screen of the display 110. In one embodiment, the electronic device 100 may identify the facial region in the body of the user through face recognition. That is, the electronic device 100 may identify the region of the display 110 in which the face of the user is reflected.

In various embodiments, the electronic device 100 may capture an image matching the appearance reflected in the display 110 operating as a mirror. To this end, the electronic device 100 may adjust the position, shooting angle, and shooting distance of the camera module and the image size. For example, when the electronic device 100 is hanging on a wall, the sensor 120 (e.g. camera module) may be configured to capture an image in front of the electronic device 100 and at a height corresponding to that of the electronic device 100. The electronic device 100 may adjust the shooting angle and magnification of the sensor 120 (e.g. camera module) according to the distance of the user sensed by the sensor 120. The electronic device 100 may identify the region of the display 110 in which the body of the user is reflected on the basis of still or moving images captured and corrected.

At operation 260, the electronic device 100 determines whether at least one user interface displayed on the display 110 at least partially overlaps the body region of the user reflected in the display 110. For example, the electronic device 100 may check whether the user interface displayed on the display 110 at least partially overlaps the body region of the user reflected in the display 110 (identified at operation 250). If the user interface overlaps the body region of the user reflected in the display 110, the procedure proceeds to operation 270. If the user interface does not overlap the body region of the user reflected in the display 110, the procedure proceeds to operation 280.

At operation 270, the electronic device 100 rearranges the user interface displayed on the display 110. The electronic device 100 may adjust the size or position of the user interface so that the user interface does not overlap the body region of the user reflected in the display 110. For example, the electronic device 100 may reduce the size of the user interface displayed on the display 110 so that the user interface does not overlap the body region of the user reflected in the display 110. The electronic device 100 may move the user interface to an upper or edge region of the display 110 so that the user interface does not overlap the body region of the user reflected in the display 110. The electronic device 100 may reduce the size of the user interface and reposition the user interface at a different site on the display 110.

In one embodiment, when the size of the body region of the user reflected in the display 110 is greater than or equal to a threshold value, the electronic device 100 may rearrange the user interface displayed on the display 110. Specifically, the electronic device 100 may examine whether the size of the body region of the user reflected in the display 110 is greater than or equal to a threshold size. The electronic device 100 may also examine whether the proportion of the body region of the user reflected in the display 110 to the whole screen of the display 110 is greater than or equal to a threshold proportion. When the size of the body region of the user reflected in the display 110 is greater than or equal to the threshold size, or when the proportion of the body region of the user reflected in the display 110 to the whole screen of the display 110 is greater than or equal to the threshold proportion, the electronic device 100 may adjust the size or position of the displayed user interface. Here, the threshold size or threshold proportion may be set in advance and changed later according to user input. Even when the body region of the user reflected in the display 110 is less than the threshold size, the electronic device 100 may rearrange the user interface by adjusting the size and position of the user interface displayed on the display 110. Alternatively, when the body region of the user reflected in the display 110 is less than the threshold size, the electronic device 100 may display the user interface just as it is without rearrangement.

In one embodiment, when an application screen or user interface is not used or not run, the electronic device 100 may rearrange the user interface displayed on the display 110. Specifically, when the user executes a specific application or interacts with the user interface not for the purpose of the mirror function, the electronic device 100 may display a corresponding application screen or user interface. In this case, although the application screen or user interface overlaps the body region of the user reflected in the display 110, the user may wish to display the application screen or user interface in the central region of the display 110 or in a large screen format. When a specific application is running or user interaction is in progress, the electronic device 100 may not rearrange the user interface displayed on the display 110. For example, when a multimedia playback application is running, the electronic device 100 may sustain the corresponding user interface (e.g. multimedia application screen) on the display 110 without changing the size or position thereof. When a specific application is running or user interaction is in progress, the electronic device 100 may reposition the corresponding application screen in the central region of the display 110 or enlarge the corresponding application screen. In another embodiment, the electronic device 100 may rearrange the user interface displayed on the display 110 only when user input for a specific application or interaction is not present. For example, when user input for initiating interaction or executing an application is received from the user, the electronic device 100 may display the corresponding user interface (e.g. application screen), which is newly output on the display 110 in response to the user input, without changing the size or position thereof although the corresponding application screen or user interface overlaps the body region of the user reflected in the display 110. As another example, when a weather application is running as a response of user input, the electronic device 100 may sustain the corresponding user interface (e.g. weather application screen) on the display 110 without changing the size or position thereof although the user interface (e.g. weather application screen) overlaps the body region of the user reflected in the display 110.

In one embodiment, when an application or user interaction is activated according to user input, the electronic device 100 may enlarge the corresponding user interface (e.g. application screen) that has been reduced in size. The electronic device 100 may also rearrange the corresponding user interface, which has been moved to a region out of the body region of the user reflected in the display 110, at the previous position or a new position on the display 110.

In one embodiment, when a new user interface is output on the display 110, the electronic device 100 may enlarge the newly output user interface or reposition the same at a different position. When a new user interface is output on the display 110, the electronic device 100 may change the size or position of at least one of the user interfaces displayed on the display 110.

At operation 280, the electronic device 100 checks whether the user is still sensed in front of the display 110. If the user is still sensed in front of the display 110, the procedure returns to operation 240. If the user is not sensed in front of the display 110, the procedure proceeds to operation 290.

At operation 290, the electronic device 100 may reset the size and position of the user interface to their initial values. For example, the electronic device 100 may move the user interface, which has been moved to an upper region on the display 110, to the central position on the display 110. The electronic device 100 may enlarge the user interface, which has been reduced in size, to its initial size. In various embodiments, when the user is not detected, the electronic device 100 may control the display 110 to operate as a mirror only. For example, the electronic device 100 may control the display 110 not to display the user interface.

In various embodiments, the electronic device 100 may control the operation of the display 110 according to the distance of the user detected in front of the display 110. For example, when the distance of the user becomes greater than a preset distance, the user interface may be reset to the initial state. When the distance of the user becomes much greater than the preset distance or when the user is not sensed anymore, the electronic device 100 may operate the display 110 as a mirror only.

In one embodiment, the electronic device 100 may determine whether the user uses the electronic device 100 as a mirror or interacts with a user interface thereof on the basis of the distance to the user, presence of user input, activation of a user interface, display of a new application screen, and display of a new user interface. Hence, the electronic device 100 may rearrange the user interface displayed on the display 110 by changing the size or position of the user interface in accordance with user intention.

According to various embodiments of the present disclosure, there may be provided a computer readable storage medium storing program instructions implementing the method of providing a user interface.

The program instructions implementing the method may be configured to display a user interface on the display 110 operating as a mirror, identify the body region of the user reflected in the display 110, check whether at least one user interface displayed on the display 110 overlaps the body region of the user reflected in the display 110, and rearrange, when the user interface overlaps the body region of the user reflected in the display 110, the user interface so that the user interface does not overlap the body region of the user reflected in the display 110.

Figure 3A:
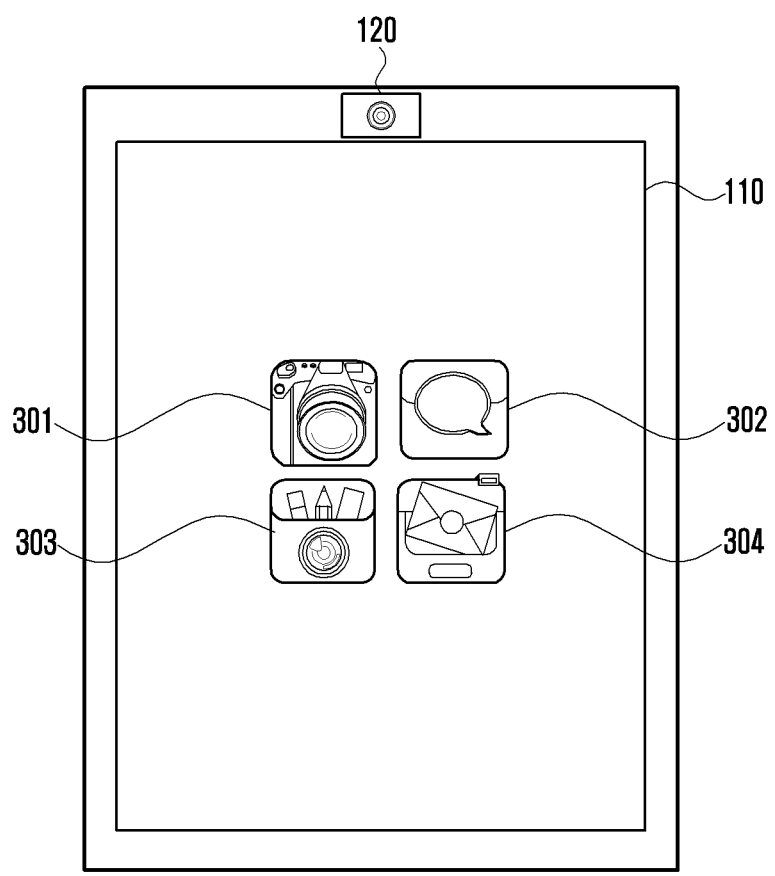
FIG. 3A and FIG. 3B illustrate the change of item positions on the user interface according to an embodiment of the present disclosure.
Figure 3B:
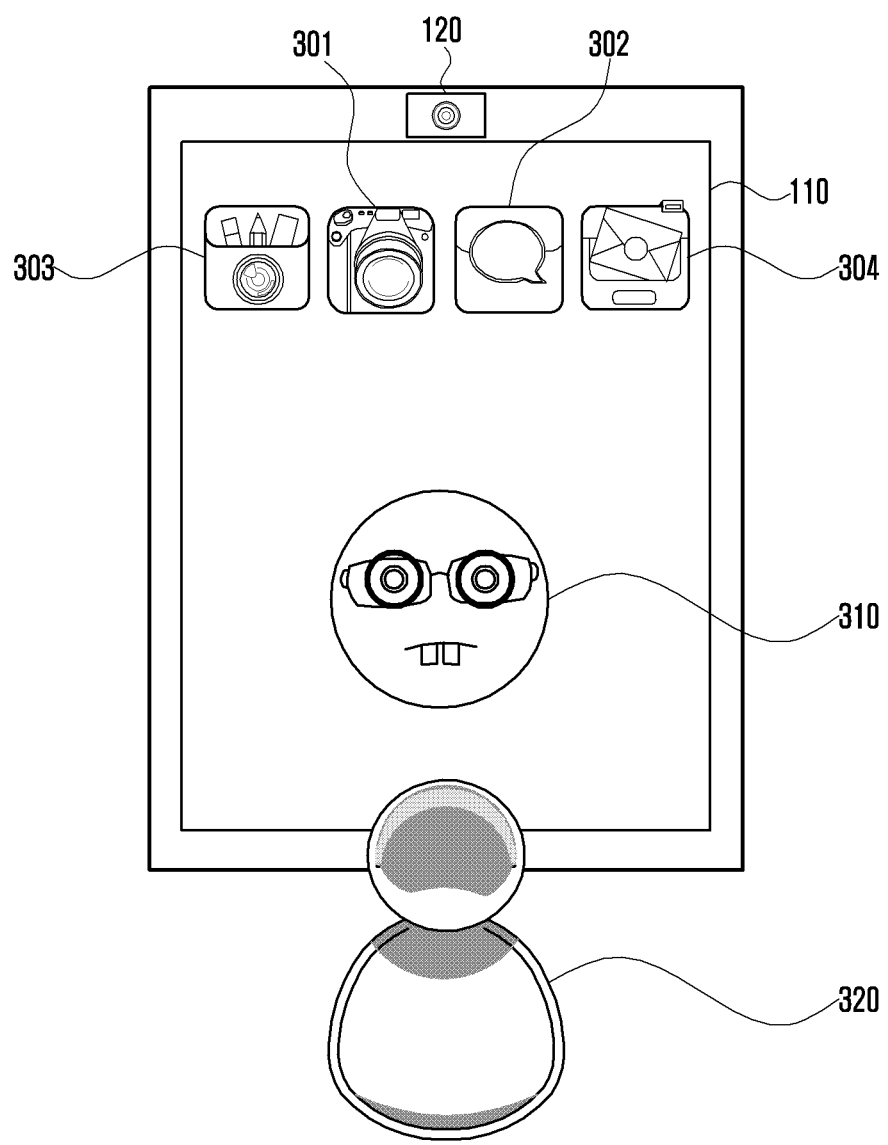

FIGS. 3A and 3B illustrate change of item positions on the user interface according to the user interface providing method for the electronic device 100.

In FIG. 3A, the electronic device 100 is displaying a user interface containing UI items 301, 302, 303 and 304. Here, application icons 301, 302, 303 and 304 are displayed in the central region of the display 110. At this time, it is assumed that the display 110 operates as a mirror. The sensor 120 (e.g. camera module) may be placed at the upper central site of the display 110. However, the camera module may also be placed at a different site. When the user 320 approaches the display 110, the appearance of the user may be reflected in the display 110 operating as a mirror. As the user 320 more closely approaches the display 110, the appearance of the user 320 reflected in the display 110 may become larger. The electronic device 100 may sense the user 320 who is approaching to manipulate the user interface containing application icons 301, 302, 303 and 304. When the body (e.g. face) of the user 320 reflected in the display 110 becomes larger, the user interface displayed on the display 110 may overlap the body region 310 of the user reflected in the display 110, making it difficult to recognize the application icons 301, 302, 303 and 304.

FIG. 3B illustrates rearrangement of the user interface containing application icons 301, 302, 303 and 304 on the display 110 under the control of the controller 130. To prevent the body region 310 (facial region) of the user reflected in the display 110 from overlapping the application icons 301, 302, 303 and 304 of the user interface displayed on the display 110, the electronic device 100 may reposition the application icons 301, 302, 303 and 304 at an upper edge site on the display 110. That is, the electronic device 100 may readjust the position of the application icons 301, 302, 303 and 304 on the user interface. In various embodiments, the electronic device 100 may reposition the UI items 301, 302, 303 and 304 at various sites on the user interface. For example, the UI items 301, 302, 303 and 304 may be moved to an upper end region of the display 110 as shown in FIG. 3B. The UI items 301, 302, 303 and 304 may also be moved separately to boundary border regions of the display 110 in a distributed fashion.

Figure 4A:
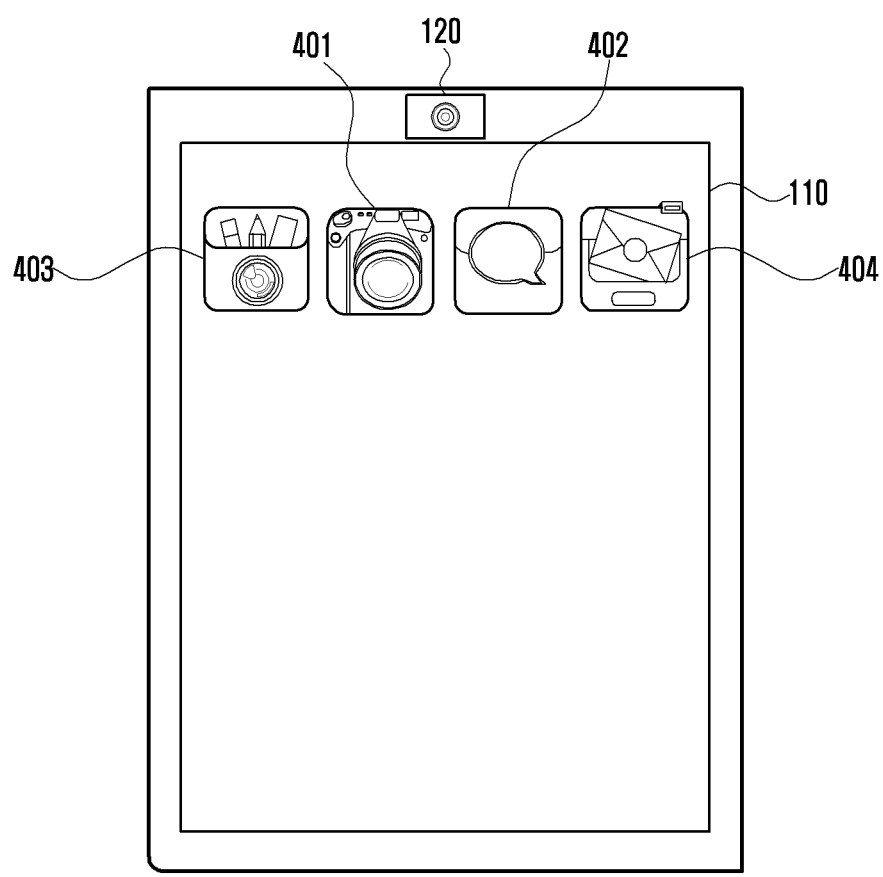
FIG. 4A and FIG. 4B illustrate the change of item sizes on the user interface according to an embodiment of the present disclosure.
Figure 4B:
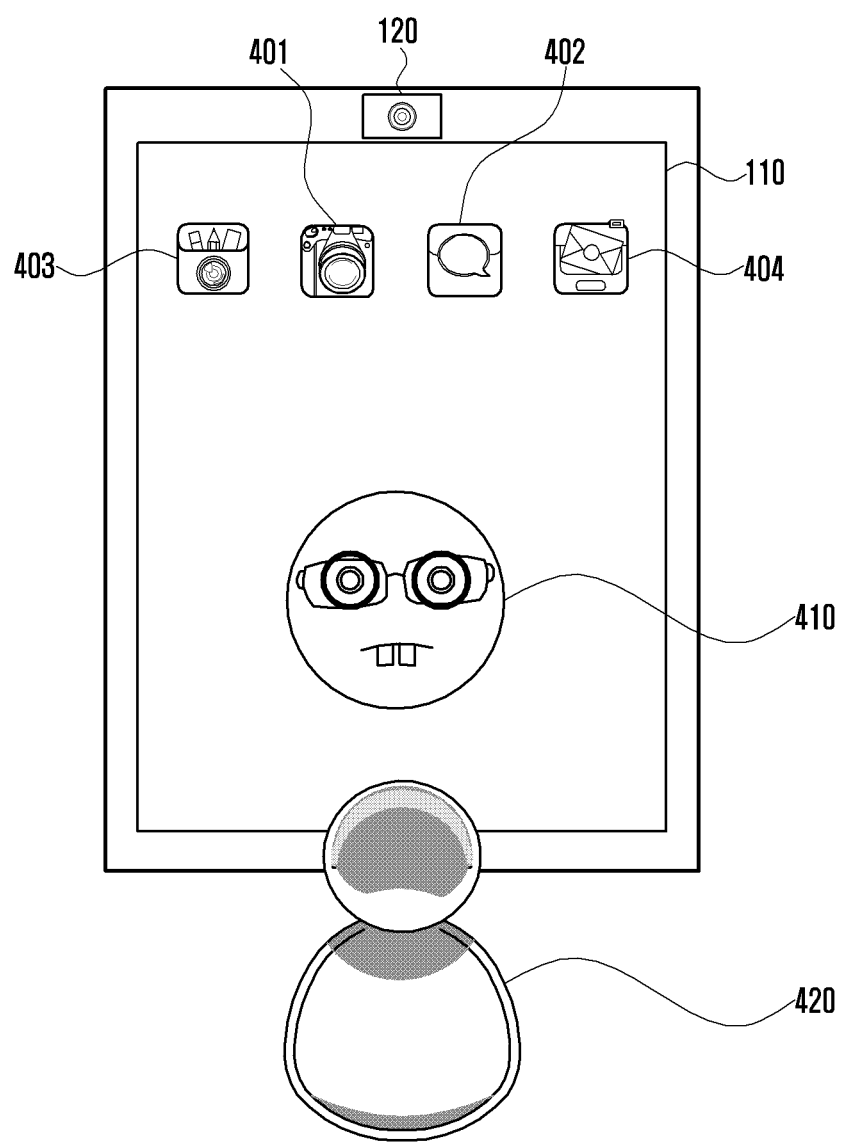

FIGS. 4A and 4B illustrate change of item sizes on the user interface according to the user interface providing method for the electronic device 100.

In FIG. 4A, the electronic device 100 is displaying a user interface containing UI items 401, 402, 403 and 404. Here, application icons 401, 402, 403 and 404 are arranged in a line in the upper region of the display 110.

In FIG. 4B, the UI items 401, 402, 403 and 404 are adjusted in size on the user interface. To keep the body region 410 of the user reflected in the display 110 from overlapping the application icons 401, 402, 403 and 404 of the user interface displayed on the display 110, the electronic device 100 may resize the application icons 401, 402, 403 and 404 of the user interface. That is, the electronic device 100 may reduce the size of the application icons 401, 402, 403 and 404 arranged in the upper region of the display 110 at a given ratio. In one embodiment, the application icons 401, 402, 403 and 404 of the user interface may be reduced in size at the same ratio or may be reduced at different ratios for different positions. For example, when multiple application icons 401, 402, 403 and 404 are arranged in a line, the electronic device 100 may sustain the size of the outer application icons 403 and 404 and reduce the size of the inner application icons 401 and 402 only to prevent them from overlapping the facial region of the user reflected in the display 110.

Figure 5A:
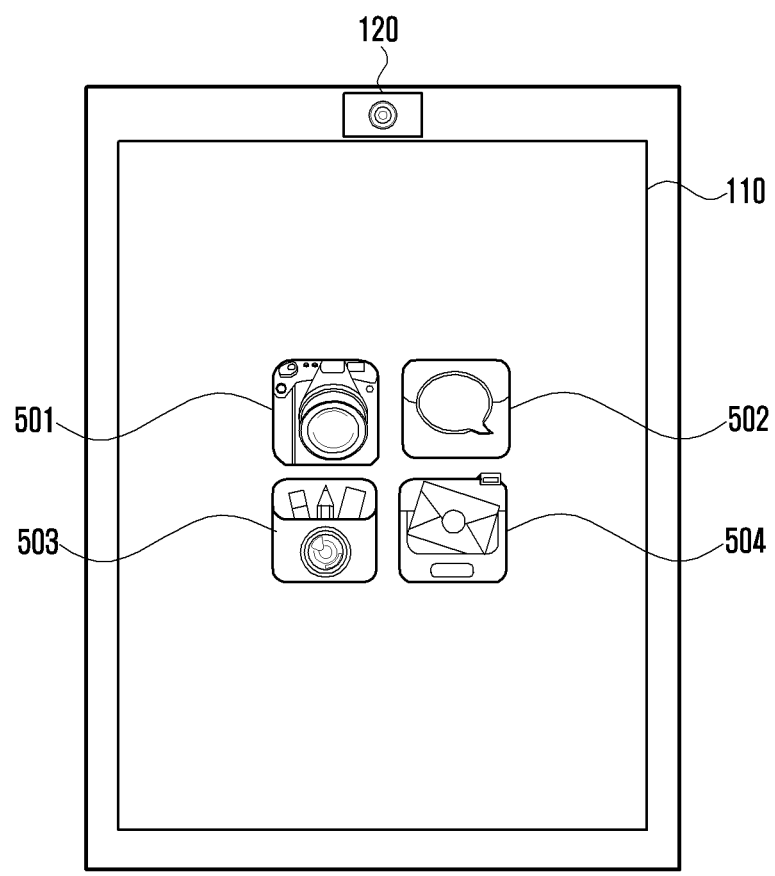
FIG. 5A, FIG. 5B and FIG. 5C illustrate the change of item positions and sizes on the user interface according to an embodiment of the present disclosure.
Figure 5B:
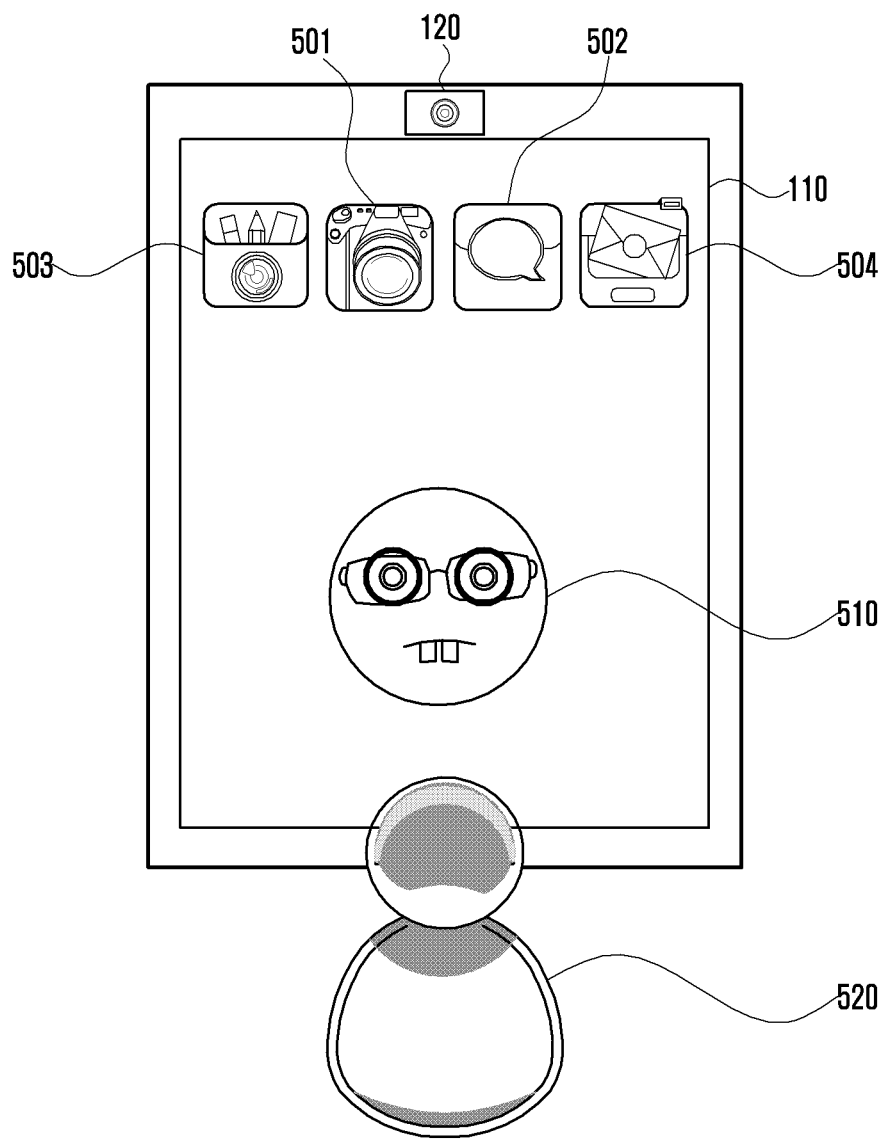
Figure 5C:
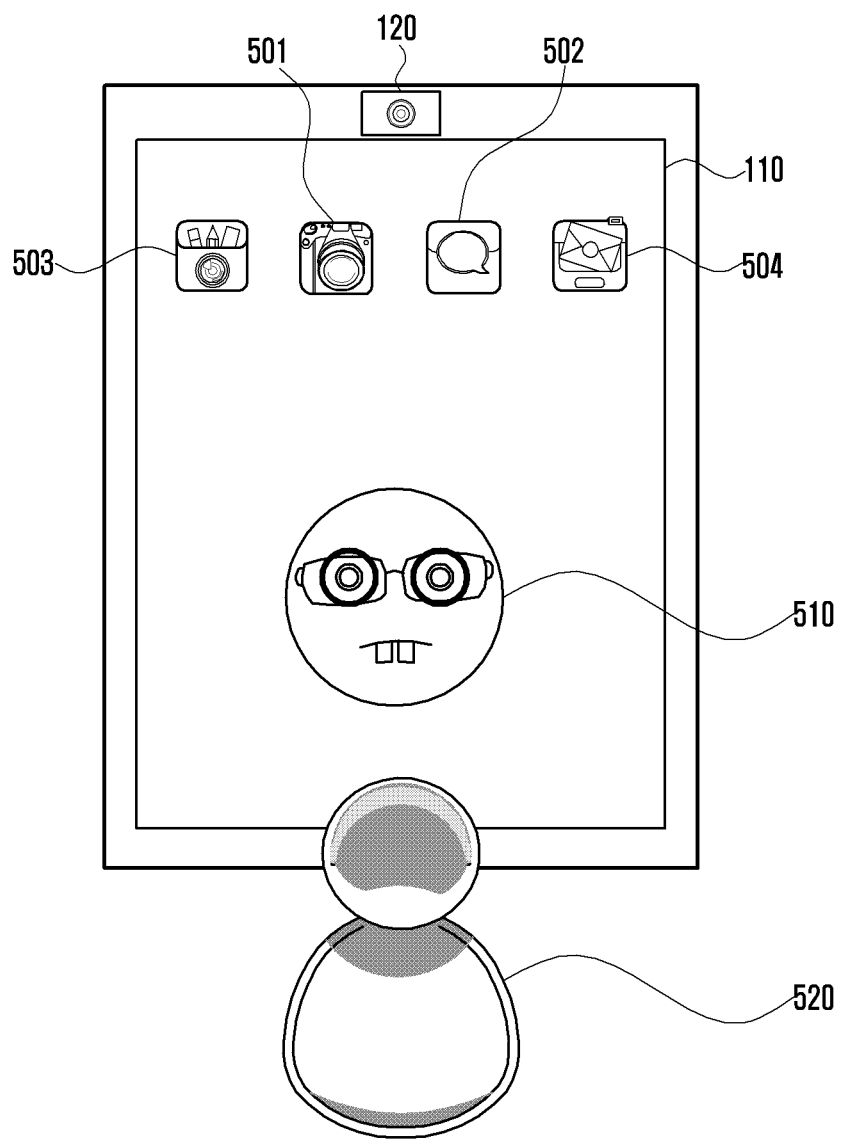

FIGS. 5A to 5C illustrate change of item positions and sizes on the user interface according to the user interface providing method for the electronic device 100.

In FIG. 5A, the electronic device 100 is displaying a user interface containing UI items 501, 502, 503 and 504. Here, application icons 501, 502, 503 and 504 are arranged in the central region of the display 110.

In FIG. 5B, when the approach of the user 520 is detected and the appearance of the user 520 is reflected in the display 110, the electronic device 100 adjusts the positions of the application icons 501, 502, 503 and 504 of the user interface. To keep the body region 510 of the user reflected in the display 110 from overlapping the application icons 501, 502, 503 and 504 of the user interface displayed on the display 110, the electronic device 100 may rearrange the user interface by adjusting the size or position of the application icons 501, 502, 503 and 504. For example, the electronic device 100 may move the application icons 501, 502, 503 and 504 to an upper end region of the display 110.

In FIG. 5C, the electronic device 100 adjusts the size of the application icons 501, 502, 503 and 504 whose positions have been adjusted. After adjusting the positions of the application icons 501, 502, 503 and 504, the electronic device 100 may check whether at least one of the application icons 501, 502, 503 and 504 overlaps the body region 510 of the user reflected in the display 110. If at least one of the application icons 501, 502, 503 and 504 overlaps the body region 510 of the user reflected in the display 110, the electronic device 100 may reduce the size of the application icons 501, 502, 503 and 504, whose positions have been adjusted on the user interface.

Figure 6A:
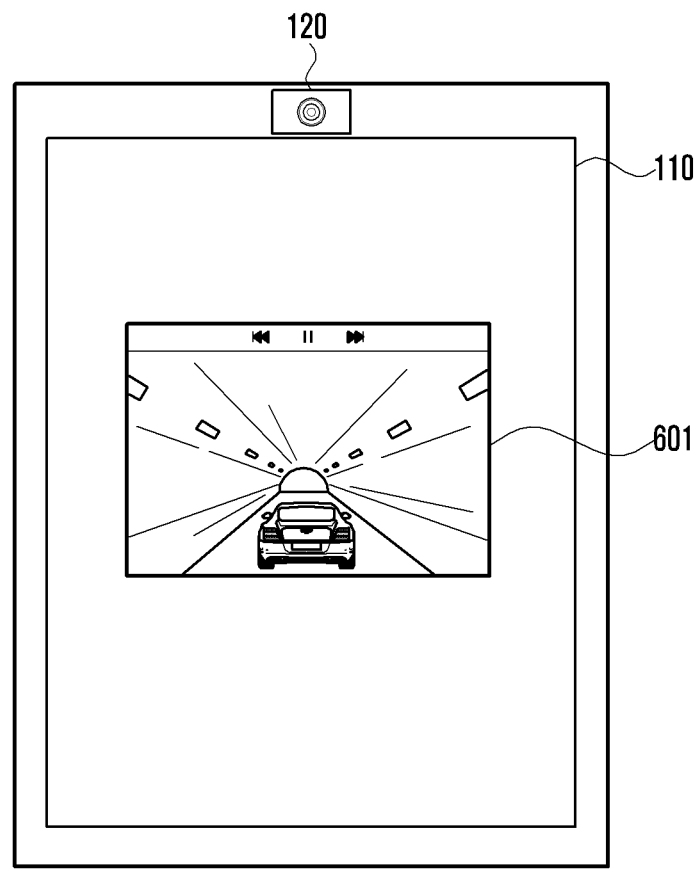
FIG. 6A and FIG. 6B illustrate the change of a screen size and a position during multimedia content playback according to an embodiment of the present disclosure.
Figure 6B:
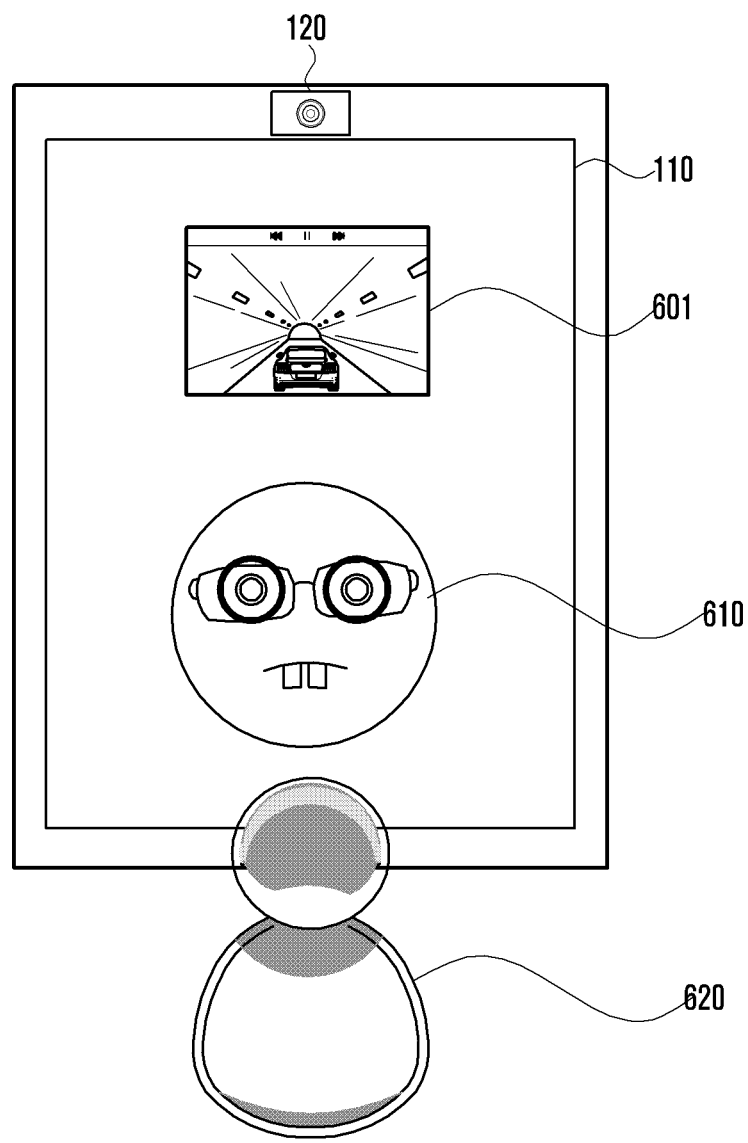

FIGS. 6A and 6B illustrate change of screen size and position during multimedia content playback according to the user interface providing method for the electronic device 100.

In FIG. 6A, the electronic device is displaying a multimedia content playback screen 601 as a user interface in the central region of the display 110. When the user 620 approaches the front of the electronic device 100, the multimedia content playback screen 601 displayed on the display 110 may overlap the body region 610 of the user reflected in the display 110 operating as a mirror. In this case, the electronic device 100 may rearrange the multimedia content playback screen 601.

In FIG. 6B, to prevent the body region 610 of the user reflected in the display 110 from overlapping the user interface 601 displayed on the display 110, the electronic device 100 adjusts the size and position of the multimedia content playback screen (user interface) 601. That is, upon detection of the approach of the user, the electronic device 100 may adjust the size and position of the multimedia content playback screen 601 so that the body region 610 of the user reflected in the display 110 does not overlap the multimedia content playback screen 601.

In the embodiments depicted in FIGS. 3 to 6, the electronic device 100 immediately rearranges the user interface upon detection of the user. However, in various embodiments, the electronic device 100 may rearrange the user interface only when user input is not present. When a specific function is executed according to user input or preset settings, the electronic device 100 may sustain the corresponding user interface without rearrangement or set the corresponding user interface to the initial state. In various embodiments, upon reception of user input, the electronic device 100 may enlarge the corresponding user interface in display or move the corresponding user interface to a different position (e.g. central region of the screen).

Figure 7:
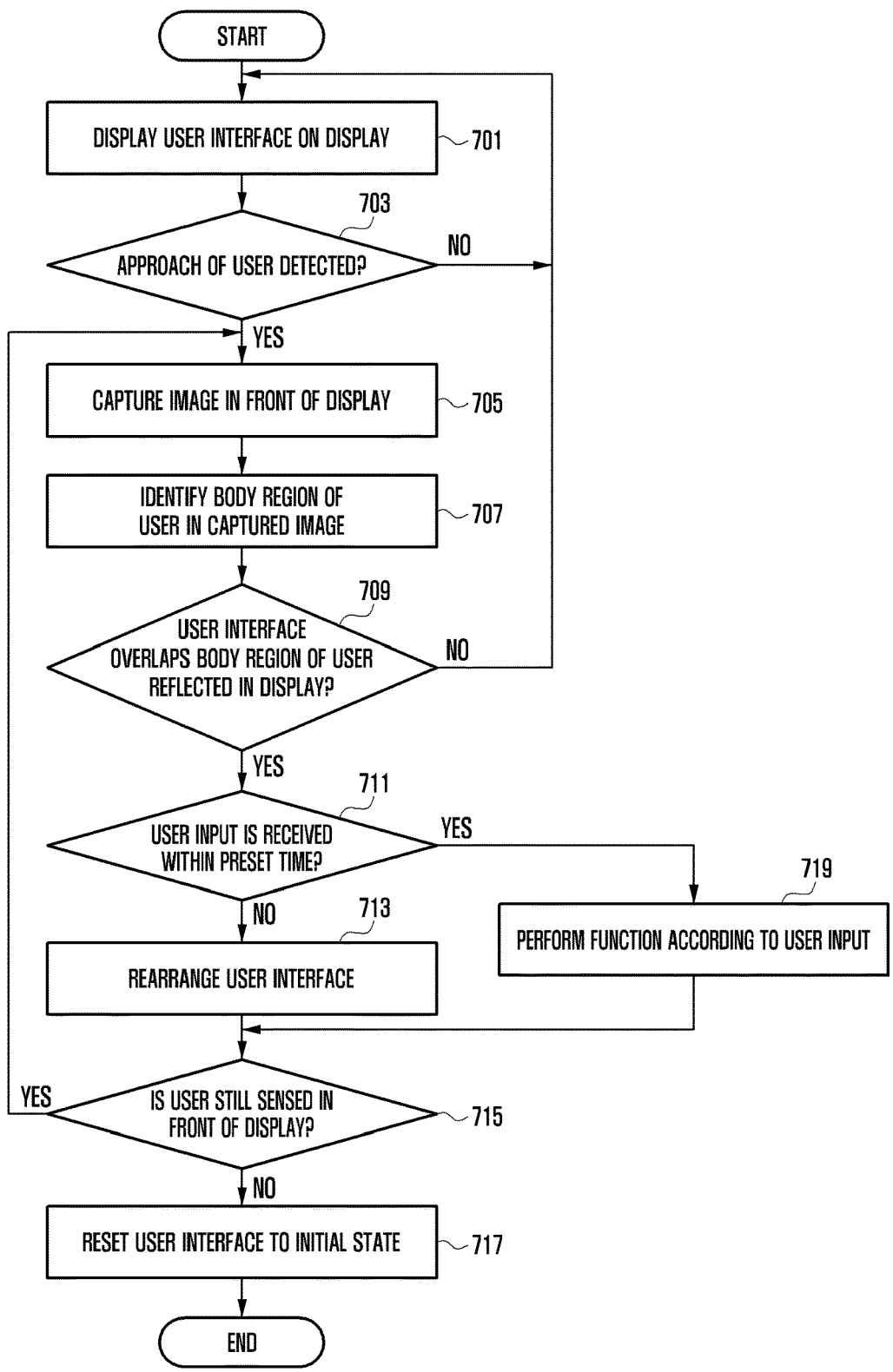
FIG. 7 is a flowchart providing an operative example of a method for providing a user interface in the electronic device according to another embodiment of the present disclosure.

FIG. 7 is a flowchart of a method for providing a user interface in the electronic device according to another embodiment of the present disclosure. At operation 701, the electronic device 100 displays at least one user interface. For example, the electronic device 100 may display an application screen, application icons, image content, or multimedia content. In various embodiments, the user interface may include a variety of objects displayable on the display 110. The user interface may be displayed on the display 110 operating as a mirror. For example, when application icons are displayed on the display 110, the region of the display 110 except for the region in which the application icons are displayed may function as a mirror screen.

In various embodiments, the electronic device 100 may operate the display 110 as a mirror. The display 110 may include a mirror or half mirror. The electronic device 100 may control the backlight or display elements (e.g. LEDs) to operate the display 110 as a mirror or as a screen for the user interface.

At operation 703, the electronic device 100 detects the approach of the user. That is, the electronic device 100 may detect the user approaching the front of the display 110. The electronic device 100 may use, for example, a proximity sensor or IR sensor to detect the approach of the user in front of the display 110. If the approach of the user is detected, the procedure proceeds to operation 705. If the approach of the user is not detected, the procedure proceeds to operation 701 at which the electronic device 100 continues to display the user interface.

In one embodiment, the electronic device 100 may display a user interface only after detection of the approach of the user while operating the display 110 as a mirror.

At operation 705, the electronic device 100 captures an image of a target object in front of the display 110. For example, the electronic device 100 may use a camera module to take a still or moving image of a target object in front of the display 110.

In one embodiment, the electronic device 100 may continuously capture an image of a target object in front of the display 110 regardless of detection of the user at operation 703.

At operation 707, the electronic device 100 identifies the region of the display 110 in which the user is reflected. The electronic device 100 may use the image captured at operation 705 to identify the body region of the user reflected in the display 110. The electronic device 100 may correct the captured image through image processing so that the image fits the display 110 in size and shape. When the body of the user is in a region of the captured image, the electronic device 100 may determine the body region of the user reflected in the display 110 by mapping the image region to the screen of the display 110.

At operation 709, the electronic device 100 determines whether at least one user interface displayed on the display 110 at least partially overlaps the body region of the user reflected in the display 110. The electronic device 100 may check whether the overlap between the user interface and the body region of the user reflected in the display 110 is greater than or equal to a given size. If the user interface overlaps the body region of the user reflected in the display 110, the procedure proceeds to operation 711. If the user interface does not overlap the body region of the user reflected in the display 110, the procedure returns to operation 701. For example, if the user interface does not overlap the body region of the user reflected in the display 110, the electronic device 100 may continue to display the existing user interface.

At operation 711, the electronic device 100 checks whether user input is received within a preset time. The electronic device 100 may receive user input through the input 170. The electronic device 100 may receive key input, voice input, gesture input, or touch input as user input. For example, the electronic device 100 may receive an input corresponding to a user touch on a specific user interface displayed on the display 110. The electronic device 100 may change the preset time for determining presence of user input.

In one embodiment, the electronic device 100 may determine the intention of the user on the basis of presence of user input. For example, when user input is received, the electronic device 100 may determine that the user wishes to interact with the user interface rather than view the mirror. When user input is not received, the electronic device 100 may determine that the user wishes to utilize the electronic device 100 as a mirror. Specifically, the electronic device 100 may determine whether to adjust the size or position of the user interface according to presence of user input. If user input is not received, the electronic device 100 may change the size or position of the user interface on the display 110 so that the user interface does not overlap the body region of the user reflected in the display 110. If user input is received, the electronic device 100 may perform a function corresponding to the user input without rearrangement of the displayed user interface. In other words, if user input is not received, the electronic device 100 may determine that the user wishes to use the electronic device 100 as a mirror and rearrange the user interface on the display 110 so that the user interface does not overlap the body region of the user reflected in the display 110. If user input is received, the electronic device 100 may determine that the user wishes to interact with the user interface and perform a function corresponding to the user input. Consequently, the electronic device 100 may perform the mirror function or provide various types of content according to user intention, enhancing user convenience and device usability.

If user input is received, the procedure proceeds to operation 719. If user input is not received, the procedure proceeds to operation 713.

At operation 713, the electronic device 100 rearranges the user interface on the display 110 so that the user interface does not overlap the body region of the user reflected in the display 110. For example, the electronic device 100 may reduce the size of the user interface on the display 110 so that the user interface does not overlap the body region of the user reflected in the display 110. The electronic device 100 may move the user interface to an upper or edge region of the display 110 so that the user interface does not overlap the body region of the user reflected in the display 110. The electronic device 100 may reduce the size of the user interface and reposition the user interface at a different site on the display 110.

Here, the electronic device 100 may rearrange the user interface in various ways as described in connection with operation 270 of FIG. 2. For example, when an application screen or user interface is not used or not run, the electronic device 100 may rearrange the user interface displayed on the display 110. When a specific application is running or user interaction is in progress, the electronic device 100 may not rearrange the user interface displayed on the display 110 or may reset the rearranged user interface to the initial state.

In one embodiment, when user input is received after rearrangement of the user interface, the electronic device 100 may change the size or position of the user interface according to the user input. For example, the electronic device 100 may enlarge the user interface on which user touch input has been detected. The controller 130 may move the user interface on which user touch input has been detected to a different site (e.g. central region) on the display 110.

In one embodiment, upon reception of user input, the electronic device 100 may perform a function corresponding to the user input. In this case, before performing the function corresponding to the user input, the electronic device 100 may enlarge the user interface corresponding to the user input or move the same to the central region of the display 110.

At operation 715, the electronic device 100 checks whether the user is still sensed in front thereof. If the user is still sensed in front of the electronic device 100, the procedure returns to operation 705. If the user is not sensed in front of the electronic device 100, the procedure proceeds to operation 717.

At operation 717, the electronic device 100 may reset the user interface to the initial state. For example, the electronic device 100 may reset the size and position of the rearranged user interface to their initial values. In one embodiment, the electronic device 100 may remove the existing user interface from the screen and display a preset initial screen (e.g. default user interface). In another embodiment, the electronic device 100 may control the display 110 to operate as a mirror only without display of a user interface.

At operation 719, the electronic device 100 performs a function corresponding to the user input. For example, the electronic device 100 may activate a user interface corresponding to the user input. The electronic device 100 may activate the user interface on which user touch input has been detected. When user touch input occurs at an icon associated with a weather application, the electronic device 100 may display an application screen providing detailed weather information. When user touch input occurs at an icon associated with a photography application, the electronic device 100 may activate the camera module and display a screen for captured user images. In various embodiments, the electronic device 100 may perform various functions according to user input.

In one embodiment, when user input is received, the electronic device 100 may sustain the corresponding user interface on the display 110 without rearrangement. For example, the electronic device 100 may perform a function corresponding to the user input without adjusting the size or position of the user interface on the display 110.

Therefore, an artisan in view of the aforementioned will understand that in the present disclosure there is adjusting of displayed interfaces with the body of the user being reflected by the display. The location of size of the interface can be adjusted to display the interface at a portion of the display where the body of the user is not being reflected (e.g. adjacent to the reflection of the user).

In addition, in an embodiment, the present disclosure only may utilize the camera to determine the body area of the use that is reflected on the display. In other words, a face of the user, such as in the illustration 310 of FIGS. 3b and 410 of FIG. 4b is not an animated image resembling the user displayed by the electronic device, but is the reflection of the user on the mirror (e.g. display).

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor", "controller", or "control" constitute hardware in the disclosure and appended claims that contain circuitry that is configured for operation. Under the broadest reasonable interpretation, the appended claims constitute statutory subject matter in compliance with 35 U.S.C. § 101 and none of the elements are software per se. The term "module" as used in this application refers to the attachable structure of portions of the housing, and such components comprise statutory subject matter.

The definition of the term "unit" is to be understood as including hardware circuitry such as a CCD, CMOS, SoC, AISC, FPGA, a processor or microprocessor (a controller) configured for a certain desired functionality, or a communication module containing hardware such as a transmitter, receiver or transceiver, or a non-transitory medium comprising machine executable code that is loaded into and executed by hardware for operation, in accordance with statutory subject matter under 35 U.S.C. § 101 and does not constitute software per se.

Meanwhile, it may be appreciated that the above embodiments of the present disclosure can be implemented in software, hardware, or a combination thereof. Software implementation is not software per se, but may be stored in, regardless of erasability or rewritability, volatile or nonvolatile storage devices such as a read only memory (ROM), memories such as a random access memory (RAM), memory chip, memory device and memory integrated chip (IC), or optically or magnetically recordable and machine or computer readable media such as a compact disc (CD), digital versatile disc (DVD), magnetic disk, and magnetic tape and is loaded into hardware such as a processor for execution.

It can be seen that the method of the present disclosure may be implemented by a computer or mobile terminal including a processor and a memory and such a memory is an example of a machine-readable storage medium that is suitable for storing one or more programs composed of instructions implementing the embodiments of the present disclosure. Hence, the present disclosure includes a program composed of codes implementing an apparatus or method claimed in any of the appended claims and a machine (computer) readable storage medium storing the program. Such a program may be electronically transferred through any medium such as a communication signal delivered via a wired or wireless connection, and the present disclosure properly includes equivalents thereof. In addition, the method and apparatus of the present disclosure may receive such a program from an external provider agent via a wired or wireless connection and store the received program. Furthermore, through adjustment of terminal settings, the user may selectively limit operations of the present disclosure to the user terminal itself or extend the same to an external server on the network for collaboration.

What is claimed is:
1. An electronic device comprising:
a controller comprising at least one processor configured to execute a mirror function by adjusting a backlight in conjunction with a mirror element;
a display in communication with the controller, the display outputs one or more of a user interface and an output of a reflection of a user if the mirror function is being executed;

a sensor that senses an approach of the user in front of the display and captures an image of the user as a target image in front of the display; and
an input device to receive an input from the user that is output to the controller;
wherein the controller controls an identification of a body region of the user reflected by the display by use of the target image captured by the sensor when the mirror function is operative, checks whether the user interface is displayed on the display and at least partially overlaps the body region of the user reflected in the display, and controls the display to adjust a size of the user interface to display the user interface on a portion of the display where the user is not being reflected, and
wherein if the user interface overlaps the portion of the display where the user is being reflected when the adjusted size of the user interface is equal to or less than a preset minimum size, the controller resets the size of the user interface to a preset initial size.

2. The electronic device of claim 1, wherein the sensor includes at least a first sensor comprising a proximity sensor or infrared sensor to detect the user approaching the front of the display and a second sensor comprising an image sensor.

3. The electronic device of claim 1, wherein, when the display of the user interface overlaps the body region of the user output by the display, the controller identifies whether the input from the user is received within a preset time and rearranges display of the user interface when the input from the user is not received within the preset time.

4. The electronic device of claim 3, wherein, when the input from the user is received after display of the user interface is rearranged, the controller adjusts display of the size or a position of the user interface being displayed on a basis of the input from the user.

5. The electronic device of claim 1, wherein the controller adjusts display of a position of the user interface being displayed so that display of the user interface does not overlap the body region of the user in the display.

6. The electronic device of claim 1, wherein the body region of the user reflected in the display corresponds to a facial region of the user reflected by the display while the mirror function is being executed.

7. The electronic device of claim 1, wherein, when the sensor senses that the user is approaching the display within a preset distance while the mirror function is being executed, the controller controls the display to output the display of the user interface.

8. The electronic device of claim 1, wherein the controller recognizes a face of the user in an image captured by the sensor and determines the region of the user's face reflected in the display based on use of the captured image.

9. The electronic device of claim 1, wherein the controller rearranges the user interface on the display when a proportion of the body region of the user reflected in the display relative to an entire screen of the display is greater than or equal to a preset threshold.

10. The electronic device of claim 1, wherein the controller rearranges display of the user interface when a specific application or user interface is not active.

11. The electronic device of claim 1, wherein, when the sensor does not sense a presence of user in front of the display, the controller resets the size and a position of the user interface to a preset initial state.

12. A method of providing a user interface for an electronic device that has a display operable as a mirror and configured to display a user interface under a control of a controller, the method comprising:

executing, by the controller, a mirror function by adjusting a backlight in conjunction with a mirror element;
displaying at least one user interface on the display while the mirror function is being executed;
capturing an image of a user in front of the display;
identifying from the captured image a body region of the user reflected by the display;
checking whether the display of at least one user interface at least partially overlaps display of the body region of the user reflected by the display;
adjust a size of the at least one user interface so display of the at least one user interface does not overlap display of the body region of the user reflected by the display; and
if the at least one user interface overlaps the display of the body region of the user reflected by the display when the adjusted size of the at least one user interface is equal to or less than a preset minimum size, resetting the size of the at least one user interface to a preset initial size.

13. The method of claim 12, wherein rearranging display of the user interface comprises:
determining, when a display of the at least one user interface overlaps the display of the body region of the user reflected by the display, whether a user input is received within a preset time; and
rearranging display of the at least one user interface when the user input is not received within the preset time.

14. The method of claim 13, further comprising adjusting display of the size or a position of the at least one user interface, when the user input is received after the user interface rearrangement, on a basis of the user input.

15. The method of claim 12, further comprising moving a display position of the at least one user interface out of the body region of the user reflected in the display.

16. The method of claim 12, wherein the body region of the user reflected by the display corresponds to a facial region of the user reflected in the display.

17. The method of claim 12 wherein displaying the at least one user interface comprises:
sensing the user approaching the front of the display; and
displaying the at least one user interface when the user approaches within a preset distance of the front of the display.

18. The method of claim 12, wherein identifying the body region of the user reflected by the display comprises:
recognizing by the controller a face of the user in the image; and
determining the region of the user's face reflected in the display by use of the image.

19. The method of claim 12, further comprising resetting, when the user is not sensed in front of the display, the size and a position of the user interface to a preset initial state.

20. The method of claim 12, further comprising rearranging the display of the at least one user interface when a proportion of the body region of the user reflected in the display relative to an entire screen of the display is greater than a preset threshold, or when a specific user interface is not active.

21. A non-transitory computer readable storage medium storing at least one program composed of instructions that cause an electronic device that executives a mirror function, and which has a display that outputs display of a user interface under control of a controller, to execute a user interface providing method, wherein the instructions are configured to display at least one user interface on the display while the mirror function is being executed by adjusting a backlight in conjunction with a mirror element, identify a body region of a user reflected in the display, check whether the at least one user interface displayed on the display overlaps display of the body region of the user reflected in the display, adjust, when display of the at least one user interface overlaps display of the body region, a size of the at least one user interface so that the display of the at least one user interface does not overlap the display of the body region of the user reflected in the display, and if the at least one user interface overlaps the display of the body region of the user reflected by the display when the adjusted size of the at least one user interface is equal to or less than a preset minimum size, reset the size of the at least one user interface to a preset initial size.

* * * * *